| (12) | United States Patent | (10) Patent No.: | US 9,897,503 B2 |
|---|---|---|---|
| | Kishida et al. | (45) Date of Patent: | Feb. 20, 2018 |

(54) CAPACITIVE PRESSURE SENSOR

(71) Applicant: HORIBA STEC, CO., LTD., Kyoto (JP)

(72) Inventors: Sotaro Kishida, Kyoto (JP); Takehisa Hataita, Kyoto (JP); Akira Kuwahara, Kyoto (JP)

(73) Assignee: HORIBA STEC, CO., LTD., Kyoto (JP)

( * ) Notice: Subject to any disclaimer, the term of this patent is extended or adjusted under 35 U.S.C. 154(b) by 131 days.

(21) Appl. No.: 14/894,094

(22) PCT Filed: Nov. 25, 2014

(86) PCT No.: PCT/JP2014/081103
§ 371 (c)(1),
(2) Date: Nov. 25, 2015

(87) PCT Pub. No.: WO2015/076413
PCT Pub. Date: May 28, 2015

(65) Prior Publication Data
US 2016/0103030 A1    Apr. 14, 2016

(30) Foreign Application Priority Data
Nov. 25, 2013    (JP) ................................. 2013-243382

(51) Int. Cl.
*G01L 9/00*    (2006.01)
*G01L 19/00*    (2006.01)
(Continued)

(52) U.S. Cl.
CPC .......... *G01L 9/0072* (2013.01); *G01L 9/0042* (2013.01); *G01L 19/0084* (2013.01); *G01L 19/04* (2013.01); *G01L 19/069* (2013.01)

(58) Field of Classification Search
CPC ...................................................... G01L 9/0072
(Continued)

(56) References Cited

U.S. PATENT DOCUMENTS

| 4,542,435 A | 9/1985 | Freud et al. |
| 4,823,603 A | 4/1989 | Ferran et al. |

(Continued)

FOREIGN PATENT DOCUMENTS

| EP | 0 902 267 | 3/1999 |
| JP | 03-064813 B2 | 10/1991 |

(Continued)

OTHER PUBLICATIONS

International Search Report, with English-language translation thereof, for PCT/JP2014/081103, dated Dec. 22, 2014.

(Continued)

*Primary Examiner* — Hezron E Williams
*Assistant Examiner* — Jean Morello
(74) *Attorney, Agent, or Firm* — Greenblum & Bernstein, P.L.C.

(57) ABSTRACT

Provided is a capacitive pressure sensor that prevents not only a change in temperature but also electromagnetic noise in the air from affecting the measurement value of pressure. In the capacitive pressure sensor, an electrode member includes: a measurement electrode fixed to an insulating positioning member and having an electrode face; a signal extraction electrode fixed with an insulating seal sealing the other end of the body; and a flexible connection member for electrically connecting the measurement electrode and the signal electrode. Moreover, the flexible connection member is accommodated in the accommodating depressed portion formed in the measurement electrode or the signal extraction electrode.

3 Claims, 7 Drawing Sheets

(51) Int. Cl.
*G01L 19/04* (2006.01)
*G01L 19/06* (2006.01)

(58) Field of Classification Search
USPC .......................................................... 73/724
See application file for complete search history.

(56) References Cited

U.S. PATENT DOCUMENTS

| | | | |
|---|---|---|---|
| 6,105,434 | A | 8/2000 | Engeler |
| 6,568,274 | B1 | 5/2003 | Lucas et al. |
| 6,615,665 | B1 | 9/2003 | Flogel et al. |
| 6,837,112 | B2 | 1/2005 | Ferran et al. |
| 7,703,329 | B2 | 4/2010 | Sekine et al. |
| 2008/0245154 | A1* | 10/2008 | Sekine ............... G01L 9/0073 73/724 |
| 2009/0015269 | A1* | 1/2009 | Pinto .................. G01L 9/0072 324/684 |
| 2012/0247216 | A1* | 10/2012 | Ishihara ............. G01L 9/0072 73/708 |
| 2013/0055820 | A1* | 3/2013 | Bourbeau ........... G01L 19/04 73/717 |

FOREIGN PATENT DOCUMENTS

| | | |
|---|---|---|
| JP | 2003-505688 | 2/2003 |
| JP | 3423686 | 7/2003 |
| JP | 4014006 | 11/2007 |
| JP | 4162990 B2 | 10/2008 |
| JP | 4798605 B2 | 10/2011 |
| JP | 4993345 B2 | 8/2012 |
| JP | 5133484 B2 | 1/2013 |
| JP | 5179752 B2 | 4/2013 |
| JP | 5384710 B2 | 1/2014 |
| JP | 5457404 B2 | 4/2014 |
| JP | 6130765 B2 | 5/2017 |
| WO | 01/07883 | 2/2001 |

OTHER PUBLICATIONS

Extended European Search Report in EP Appl. No. 14 863 368.8 dated Dec. 5, 2016.

Office Action issued in Japanese family member Patent Appl. No. 2015-549226, dated Nov. 14, 2017, along with an English-language translation thereof.

\* cited by examiner (a)

(b)

CAPACITIVE PRESSURE SENSOR

TECHNICAL FIELD

The present invention relates to a capacitive pressure sensor for measuring the pressure of a fluid based on a change in capacitance between a diaphragm that deforms under pressure and an electrode member opposed to the diaphragm.

BACKGROUND ART

A capacitive pressure sensor used in, for example, measuring the pressure of a gas in a semiconductor manufacturing process or other processes includes a diaphragm joined to one end of a cylindrical body and an electrode member whose signal extraction side is fixed to the other end of the body with an insulator and having an electrode face opposed to the diaphragm with a gap between the diaphragm and the electrode face.

Such a capacitive pressure sensor has the following problem: the position of the electrode face in the body changes with a change in the position at which the signal extraction side of the electrode member is fixed, due to some reasons. Thus, the gap significantly deviates from a designed value, decreasing the measurement accuracy of pressure.

Moreover, Patent Literature 1 and FIG. 7 illustrate an example of a capacitive pressure sensor. More specifically, a capacitive pressure sensor 100A illustrated in FIG. 7 includes a body 1A, a diaphragm 2A, an electrode member 3AA, and an insulating positioning member 4A. The body 1A is substantially cylindrical, and is made of a metal such as stainless steel. The diaphragm 2A is joined to and blocks one end of the body 1A. The electrode member 3AA has an electrode face 3SA opposed to and a predetermined gap apart from the diaphragm 2A. The insulating positioning member 4A made of a glass, ceramic, or other materials is supported by the body 1A, and positions the electrode member 3AA in the body 1A.

The electrode member 3AA includes the electrode face 3SA, a signal extraction electrode 32A, and a spring 33A. The electrode face 3SA is a metal film evaporated onto the end face of the insulating positioning member 4A. The signal extraction electrode 32A is fixed with an insulating seal 6A that is a glass sealing the other end of the body 1A, and extracts a signal to the outside of the body 1A. The spring 33A electrically connects the electrode face 3SA and the signal extraction electrode 32A, and has one end fixed to the signal extraction electrode 32A. Such a structure is intended to inhibit a change in the gap between the diaphragm 2A and the electrode face 3SA due to the thermal deformation of the body 1.

However, in the structure in which the spring 33A connects the electrode face 3SA and the signal extraction electrode 32A as FIG. 7 illustrates, the spring 33A is exposed to the air. Thus, the spring 33A picks up electromagnetic noise, thereby deteriorating the signal-to-noise ratio of a signal obtained from the electrode face 3SA. This decreases the measurement accuracy of pressure.

CITATION LIST

Patent Literature

[PTL 1] Japanese Unexamined Patent Application Publication No. 2003-505688

SUMMARY OF INVENTION

Technical Problem

In view of the above problems, the present invention provides a capacitive pressure sensor that prevents not only a change in temperature but also electromagnetic noise in the air from affecting a measurement value of pressure.

Solution to Problem

That is, a capacitive pressure sensor according to the present invention includes: a diaphragm that deforms under pressure; an electrode member having an electrode face opposed to the diaphragm with a gap between the diaphragm and the electrode face; and a body having one end to which the diaphragm is joined, and accommodating at least a portion of the electrode member, in which the electrode member includes: a measurement electrode provided in the body and having the electrode face; a signal extraction electrode fixed to the other end of the body, and extracts a signal from the measurement electrode; and a flexible connection member that electrically connects the measurement electrode and the signal extraction electrode, and the flexible connection member is accommodated in the accommodating depressed portion formed in the measurement electrode or the signal extraction electrode.

In such a capacitive pressure sensor, the flexible connection member is accommodated in the accommodating depressed portion formed in the measurement electrode or the signal extraction electrode made of metal. Thus, the flexible connection member is electrostatically shielded, thereby preventing the flexible connection member from picking up electromagnetic noise in the air. Accordingly, the signal-to-noise ratio of a signal obtained by the signal extraction electrode can be improved, and thus the measurement accuracy of pressure can be improved.

Moreover, since the electrode member is separated into the measurement electrode and the signal extraction electrode, the electrode face is less likely to be affected by the thermal deformation of the body. Thus, the gap between the diaphragm and the electrode face and the measurement accuracy of pressure are less likely to be affected by a change in temperature. Moreover, even if the position at which the signal extraction electrode is fixed to the body with the insulator or others is shifted by some reasons other than the thermal deformation, the measurement electrode separated from the signal extraction electrode is not affected by the shift of the position. Thus, the measurement accuracy of pressure does not decrease. Accordingly, it is possible to make a capacitive pressure sensor robust to both a change in temperature and electromagnetic noise in the air.

The accommodating depressed portion may be formed in one of the measurement electrode and the signal extraction electrode, and a portion of the other of the measurement electrode and the signal extraction electrode may be an insertion inserted into the accommodating depressed portion, and the flexible connection member may be provided between the insertion and the accommodating depressed portion. This makes it possible that in the place accommodating the flexible connection member, there is little space which electromagnetic noise in the air enters, while achieving the structure in which the measurement electrode and the signal extraction electrode are separated.

The flexible connection member may be an elastic body so that the elasticity of the flexible connection member allows the flexible connection member to come in contact with the measurement electrode and the signal extraction electrode. In such a structure, even if the thermal deformation of the body moves the position at which the signal extraction electrode is fixed, the amount of movement of the position is hardly transmitted to the measurement electrode, thus causing little change in the gap between the diaphragm and the electrode face. Such a flexible connection member is not fixed to the measurement electrode or the signal extraction electrode, but is only in contact with the measurement electrode and the signal extraction electrode. Thus, the change in the position at which the signal extraction electrode is fixed is less likely to be transmitted to the electrode face while keeping the electrical connection.

Advantageous Effects of Invention

In the capacitive pressure sensor according to the present invention, the electrode member is separated into the measurement electrode and the signal extraction electrode, and the flexible connection member for connecting these electrodes is accommodated in the accommodating depressed portion formed in the measurement electrode or the signal extraction electrode. Accordingly, electrostatic shielding can prevent the flexible connection member from picking up electromagnetic noise in the air. This can improve the signal-to-noise ratio of a signal obtained by the signal extraction electrode, and the measurement accuracy of pressure.

Figure 1:
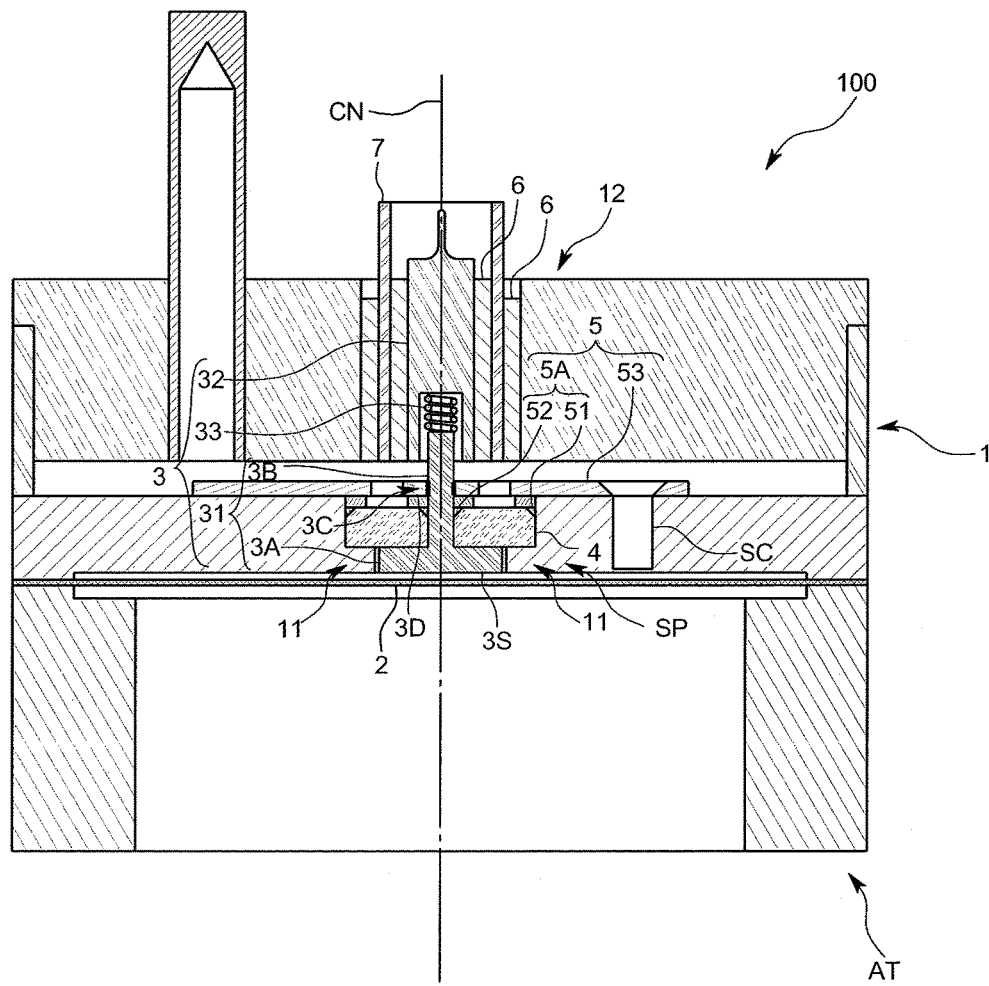
FIG. 1 schematically illustrates a cross section of a capacitive pressure sensor according to an embodiment of the present invention.

REFERENCE SIGNS LIST 100 capacitive pressure sensor
1 body
11 support part
2 diaphragm
3 electrode member
31 measurement electrode
32 signal extraction electrode
33 spring (flexible connection member)
3A opposite portion
3B penetration
3C threaded portion
3D nut
3E accommodating depressed portion
3F insertion
3S electrode face
4 insulating positioning member
41 flat surface
5 pressing mechanism
51 first ring-shaped component
52 second ring-shaped component
5A position adjuster
5P pressed surface
5C contact surface
53 pressing plate
6 insulating seal
SC fixing screw
PL support plane

DESCRIPTION OF EMBODIMENTS

With reference to FIGS. 1 to 4, a capacitive pressure sensor 100 according to an embodiment of the present invention is described below.

The capacitive pressure sensor 100 is used for measuring the pressure of a fluid in a flow control device such as a mass flow controller or a pressure control device. As FIG. 1 illustrates, the capacitive pressure sensor 100 includes a diaphragm 2 that deforms under the fluid pressure and an electrode face 3S opposed to the diaphragm 2. The capacitive pressure sensor 100 measures the pressure by a change in capacitance between the diaphragm and the electrode face 3S.

Figure 2:
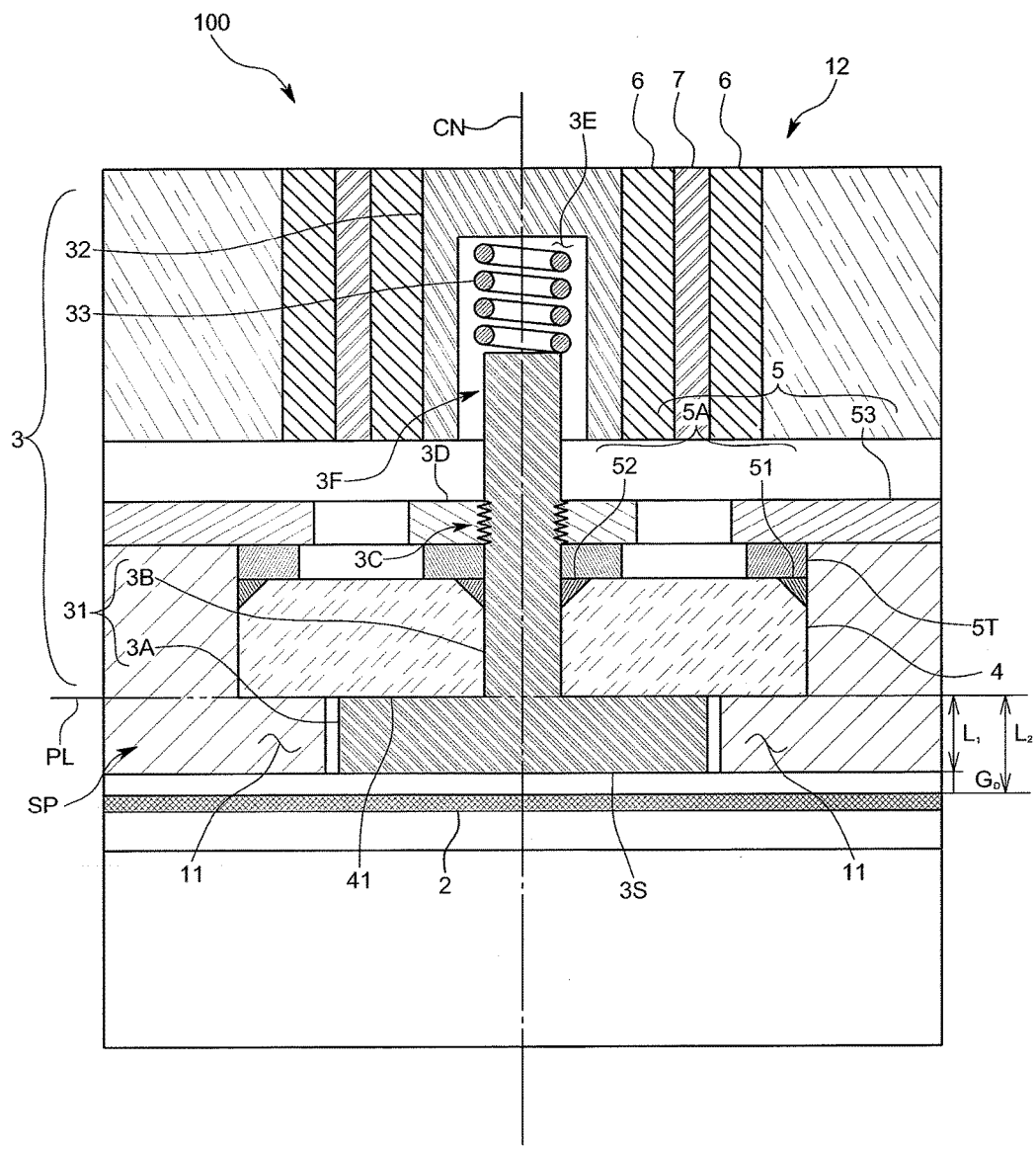
FIG. 2 schematically illustrates an enlarged cross section of a diaphragm, an electrode face, and their vicinity in the embodiment.

More specifically, as FIG. 1 illustrates, the capacitive pressure sensor 100 includes an attachment part AT that is substantially hollow cylindrical and attached to a flow path through which the fluid flows, and a body 1 provided above the attachment part AT and accommodating components. The body 1 is substantially cylindrical and made of a metal such as stainless steel. The diaphragm 2 is joined to and blocks one end of the body 1 while an opening at the other end is sealed with a lid 12. As FIGS. 1 and 2 illustrate, the body 1 accommodates a portion of an electrode member 3, an insulating positioning member 4, and a pressing mechanism 5. The electrode member 3 has the electrode face 3S. The insulating positioning member 4 positions the portion of the electrode member 3. The pressing mechanism 5 holds and presses the insulating positioning member 4 in the horizontal direction in the figures. The components accommodated in the body 1 are symmetric to a central axis CN of the body 1.

The details of the components are described below.

The electrode member 3 is made of a metal having the value of a coefficient of linear expansion close to that of the body 1, and includes a measurement electrode 31, a signal extraction electrode 32, and a spring 33. The measurement electrode 31 is attached to the insulating positioning member 4, and has the electrode face 3S. The signal extraction electrode 32 is fixed to the other end of the body 1 with the lid 12, and extracts a signal from the measurement electrode 31. The spring 33 is a flexible connection member for electrically connecting the measurement electrode 31 and the signal extraction electrode 32.

The measurement electrode 31 is substantially reverse T-shaped in the enlarged vertical section in FIG. 2, and includes an opposite portion 3A that is substantially disk-shaped and a penetration 3B that is column-shaped. The opposite portion 3A has the electrode face 3S having a shape of a circle and opposed to and a predetermined gap apart from the diaphragm 2. The penetration 3B projects from the center of the opposite portion 3A toward an insulating seal 6, penetrating the insulating positioning member 4. In a fixing screw mechanism, a threaded portion 3C is formed in the central area of the outer peripheral surface of the penetration 3B, and by screwing a nut 3D onto the threaded portion 3C, the insulating positioning member 4 is held with the nut 3D and the top of the opposite portion 3A. That is, the measurement electrode 31 and the insulating positioning member 4 are joined together. Thus, only the force from the insulating positioning member 4 substantially determines the position of the measurement electrode 31 in the body 1.

The signal extraction electrode 32 extracts to the outside a signal representing a voltage value to show that the capacitance between the diaphragm 2 and the electrode face 3S has changed with a change in the gap therebetween. As FIGS. 1 and 2 illustrate, the signal extraction electrode 32 is covered with a shielding cap 7 that is hollow cylindrical and made of metal. The insulating seal 6 is provided between the signal extraction electrode 32 and the shielding cap 7 so that the signal extraction electrode 32 is fixed. One end of the signal extraction electrode 32 is inside the insulating seal 6, and the other end is exposed to the outside of the body 1. Moreover, an accommodating depressed portion 3E that is substantially column-shaped and accommodates the spring 33 is formed at the one end of the signal extraction electrode 32. In a state where the components are assembled, an insertion 3F that is an end portion of the penetration 3B is inserted into the accommodating depressed portion 3E.

The natural length of the spring 33 is more than the distance between the insertion 3F and the bottom of the accommodating depressed portion 3E. As FIG. 2 illustrates, the spring 33 is pre-shrunk and provided between the insertion 3F and the bottom of the accommodating depressed portion 3E. The spring 33 is unfixed between the bottom of the accommodating depressed portion 3E and the end face of the insertion 3F, and keeps contact with the bottom and the end face by stretching. As is clear from FIG. 2, the spring 33 is surrounded mostly by a metal, and there is only a little space between the outer peripheral surface of the insertion 3F and the inner peripheral surface of the upper portion of the accommodating depressed portion 3E. That is, an electrostatic shielding structure is formed to prevent electromagnetic noise in the air from entering the spring 33 in the accommodating depressed portion 3E.

The following describes in detail a support structure SP for preventing the gap between the electrode face 3S and the diaphragm 2 from changing even if there have been changes in temperature in the insulating positioning member 4 and the capacitive pressure sensor 100.

As FIG. 2 illustrates, the insulating positioning member 4 is a disk-shaped component made of a glass or ceramic and having in the center a hole through which the penetration 3B passes. The edges of the top of the insulating positioning member 4 are cut at an angle of 45 degrees to insert a position adjustor 5A described later, and a flat surface 41 is at the end of the insulating positioning member 4 on the side where the diaphragm 2 is formed. The insulating positioning member 4 is supported by a support part 11 projecting toward the inside of the body 1 so that the flat surface 41 substantially matches a support plane PL a predetermined distance apart from the diaphragm 2 toward the other end of the body 1. As is clear from FIG. 2, the insulating positioning member 4 is not provided between the diaphragm 2 and the support plane PL, which matches the top of the support part 11. Moreover, as FIG. 2 illustrates, the dimension in the axial direction of the support part 11 is substantially the same as that of the opposite portion 3A. Here, the axial direction is the direction vertical to the diaphragm 2 receiving balanced pressure on the top and bottom and being a thin plate. That is, when the direction in which the diaphragm 2 is formed is viewed from the support plane PL, which matches the top of the support part 11, only a portion of the electrode member 3 projects toward the diaphragm 2.

With the support structure SP for supporting the insulating positioning member 4, even if a change in temperature thermally deforms the body 1, there is little change in the gap between the diaphragm 2 and the electrode face 3S. The following describes why that is so.

In the design, the distance in the axial direction from the diaphragm 2 to the support plane PL, which matches the top of the support part 11, is $L_1$. However, if the distance from the diaphragm 2 to the top of the support part 11 has become $L_1+\Delta L_1$ due to the thermal expansion of the body 1 caused by an increase in temperature in the body 1, the flat surface 41 moves upward by $\Delta L_1$ from the support plane PL. If there were no thermal expansion in the support portion 3A, the gap would increase by $\Delta L_1$. In reality, however, the opposite portion 3A thermally expands since the opposite portion 3A is made of metal in the present embodiment. Thus, if the dimension in the axial direction of the opposite portion 3A is $L_2$ in the design, the dimension after the thermal expansion is $L_2+\Delta L_2$. Therefore, if the value of the gap in the design is $G_D$ and the value of the gap after the thermal expansion of the body 1 is $G_T$, $G_D=L_1-L_2$, and $G_T=(L_1+\Delta L_1)-(L_2+\Delta L_2)$. Based on these expressions, the value of the gap after the thermal deformation of the body 1 is $G_D=G_T+(\Delta L_1-\Delta L_2)$. Here, $L_1$ and $L_2$ are substantially equal since the gap is set to a very small value that is around several tens of micron, to measure the capacitance. $\Delta L_1-\Delta L_2 \approx 0$ is made possible by forming the body 1 and electrode member 3 with metals having similar values of the coefficients of liner expansion. Thus, $G_D \approx G_T$. It should be noted that similar explanation is applicable to the thermal shrinkage of the body 1.

In the support structure SP, only the body 1 and the opposite portion 3A, which are made of metal, are between the diaphragm 2 and the support plane, which matches the top of the support part 11, and there are no components having significantly different coefficients of linear expansion therebetween. Accordingly, the gap can be always kept constant irrespective of a change in temperature.

The following describes the pressing mechanism 5.

As FIG. 2 illustrates, the pressing mechanism 5 includes a position adjuster 5A and a pressing plate 53. The position adjuster 5A includes two components that have shapes of substantially C-shaped rings and serve as wedges to be fitted to the edges of the top of the insulating positioning member 4. The pressing plate 53 presses the top of the position adjuster 5A toward the diaphragm 2. Here, the pressing plate 53 covers the tops of the components of the position adjuster 5A. The pressing plate 53 is screwed to the body 1 with a fixing screw SC in the axial direction. When the fixing screw SC is tightened, the position adjuster 5A is pressed toward the diaphragm 2 via intercalations 5T.

Figure 3:
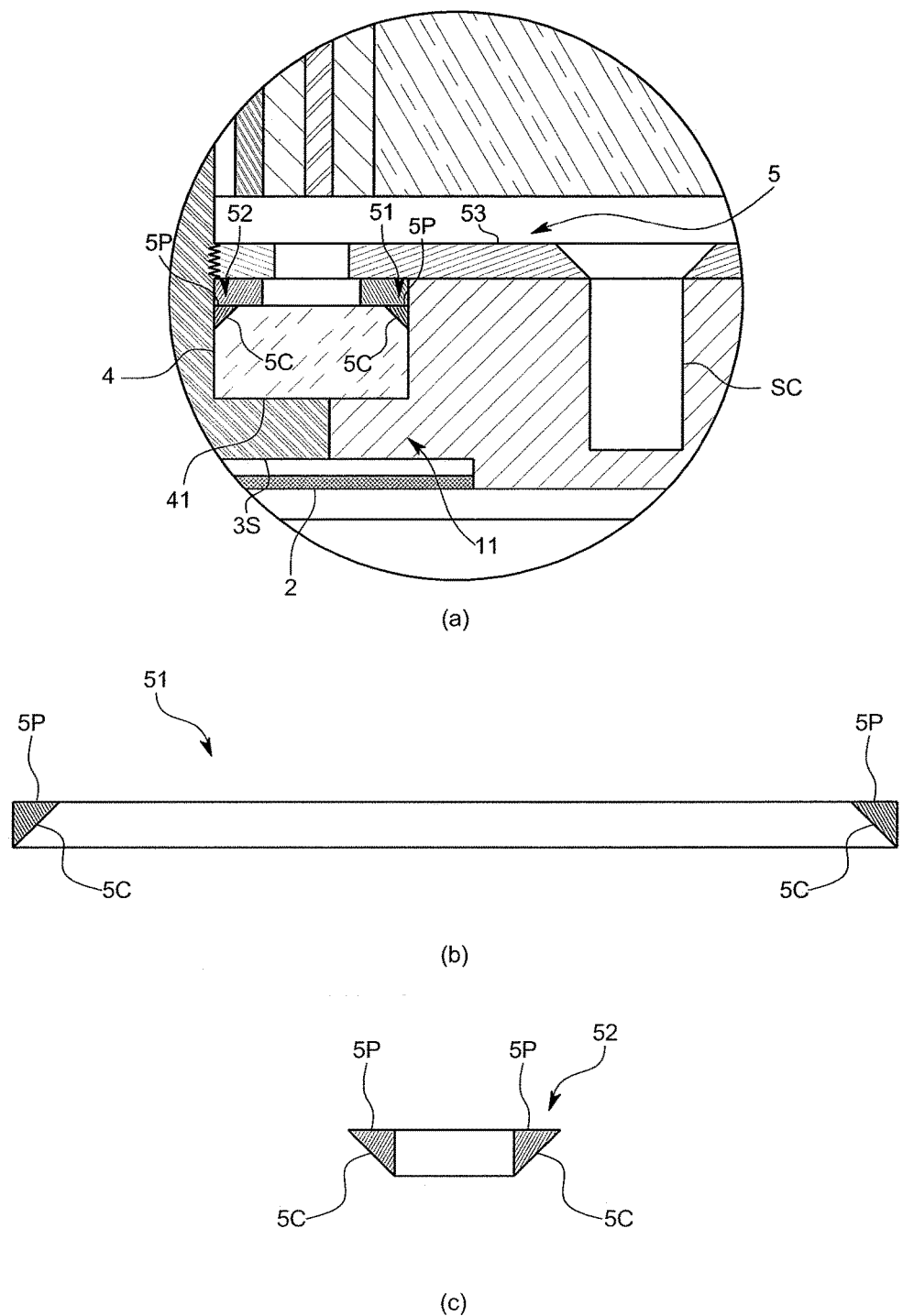
FIG. 3 schematically illustrates in (a)-(c) an enlarged cross section of a pressing mechanism for pressing an insulating positioning member and its vicinity in the embodiment.
Figure 4:
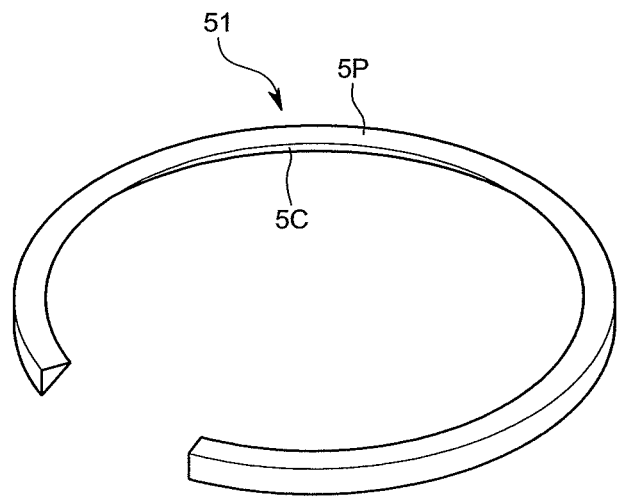
FIG. 4 in (a) and (b) is a schematic perspective view of a position adjustor in the embodiment.
Figure 4:
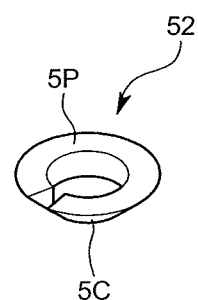

The position adjuster 5A includes a first ring-shaped component 51 and a second ring-shaped component 52. The first ring-shaped component 51 is fitted to the outer peripheral edge of the top of the insulating positioning member 4. The second ring-shaped component 52 is fitted to the inner peripheral edge of the top of the insulating positioning member 4. As FIGS. 2 and 3 illustrate, the tops of the first ring-shaped component 51 and the second ring-shaped component 52 are pressed surfaces 5P to be pressed by the force in the axial direction of the pressing plate 53. Moreover, as illustrated in the vertical sections in (b) and (c) in FIG. 3, and in the perspective views in (a) and (b) in FIG. 4, the inner side surface of the first ring-shaped component 51 and the outer side surface of the second ring-shaped component 52 are contact surfaces 5C that are in contact with the insulating positioning member 4 and with which the insulating positioning member 4 is to be obliquely pressed. The outer side surface of the first ring-shaped component 51 is in contact with the body 1. The inner side surface of the second ring-shaped component 52 is in contact with the outer peripheral surface of the penetration 3B. That is, when the pressing plate 53 presses the first ring-shaped component 51 and the second ring-shaped component 52 toward the diaphragm 2, they bite into the insulating positioning member 4 toward the diaphragm 2, acting like wedges. Thus, the force is resolved at the contact surfaces 5C, and the insulating positioning member 4 is pressed in the axial direction and in the radial direction at the same time. Here, the radial direction is the direction parallel to the diaphragm 2 receiving balanced pressure on the top and bottom and being a thin plate. In other words, the first ring-shaped component 51 and the second ring-shaped component 52 are wedge-like components having shapes of substantially C-shaped rings, i.e., having cutout portions. Thus, both the extents of the first ring-shaped component 51 and the second ring-shaped component 52 and the amounts of biting change, depending on the amount of pressing of the pressing plate 53. The insulating positioning member 4 is pressed in the axial direction and in the radial direction.

The pressing mechanism 5 having such a structure keeps the state where the centers of the electrode face 3S and the diaphragm 2 match the central axis CN. The following describes this effect.

As FIG. 2 and (a) in FIG. 3 illustrate, the insulating positioning member 4 is held with the contact surface 5C of the first ring-shaped component 51 and the contact surface 5C of the second ring-shaped component 52 in the radial direction, i.e., the direction parallel to the diaphragm 2. Forces in the opposite directions are applied from the contact surfaces 5C. If the insulating positioning member 4 moves in the right direction in the figures, the insulating positioning member 4 abuts only on the first ring-shaped component 51. The first ring-shaped component 51 then pushes back the insulating positioning member 4 toward the second ring-shaped component 52. The insulating positioning member 4 moves to the position where the center of the insulating positioning member 4 matches the central axis CN. At the position, the forces from the first ring-shaped component 51 and the second ring-shaped component 52 are balanced. Moreover, if the insulating positioning member 4 moves in the left direction in the figures, the pressing mechanism 5 pushes back the insulating positioning member 4 to the original position in the same manner. Accordingly, the pressing mechanism 5 keeps the center of the insulating positioning member 4 at the central axis. Thus, the electrode face 3S and the measurement electrode 31 fixed to the insulating positioning member 4 are also kept at the same positions in the radial direction.

In the capacitive pressure sensor 100 according to the present embodiment, the support structure SP for supporting the insulating positioning member 4 and the measurement electrode 31, which are accommodated in the body 1, makes it possible that even if a change in temperature thermally deforms the body 1, there is little change in the gap between the diaphragm 2 and the electrode face 3S. Accordingly, the measurement value of pressure is hardly affected by a change in temperature.

Moreover, the pressing mechanism 5 can prevent the electrode face 3S from deviating from the original position in the direction parallel to the diaphragm 2, and keep the centers of the diaphragm 2 and the electrode face 3S at the central axis CN. Thus, the electrode face 3S is almost always opposed to the central area that deforms due to a change in pressure more significantly than the other areas of the diaphragm 2. This prevents the electrode face 3S from detecting changes in capacitance caused by factors other than pressure.

Furthermore, the electrode member 3 is separated into the measurement electrode 31 and the signal extraction electrode 32, and the measurement electrode 31 can freely move. Thus, the effects of the support structure SP and the pressing mechanism 5 are not hindered, that is, the above effects are more easily obtained.

In addition, the spring 33 for connecting the measurement electrode 31 and the signal extraction electrode 32 is accommodated in the accommodating depressed portion 3E, and almost electrostatically shielded. Thus, the signal-to-noise ratio of measured pressure can be prevented from decreasing due to the superimposition of electromagnetic noise on a signal obtained in the electrode face 3S.

Accordingly, the capacitive pressure sensor 100 in the present embodiment can measure pressure with very high accuracy.

It should be noted that since the bottom of the insulating positioning member 4 is formed as the flat surface 41, the bottom has high accuracy of, for example, flatness. The opposite portion 3A of the measurement electrode 31 is attached to the flat surface 41, thereby making it easier to achieve high parallelism between the electrode face 3S and the diaphragm 2, and high measurement accuracy of pressure.

Moreover, since screw fixing is employed as a way to fix the measurement electrode 31 to the insulating positioning member 4, the assembling is easily simplified while maintaining the accuracy of the assembling.

The following describes other embodiments. It should be noted that identical reference signs are used to designate components corresponding to the components in the above embodiment.

Figure 5:
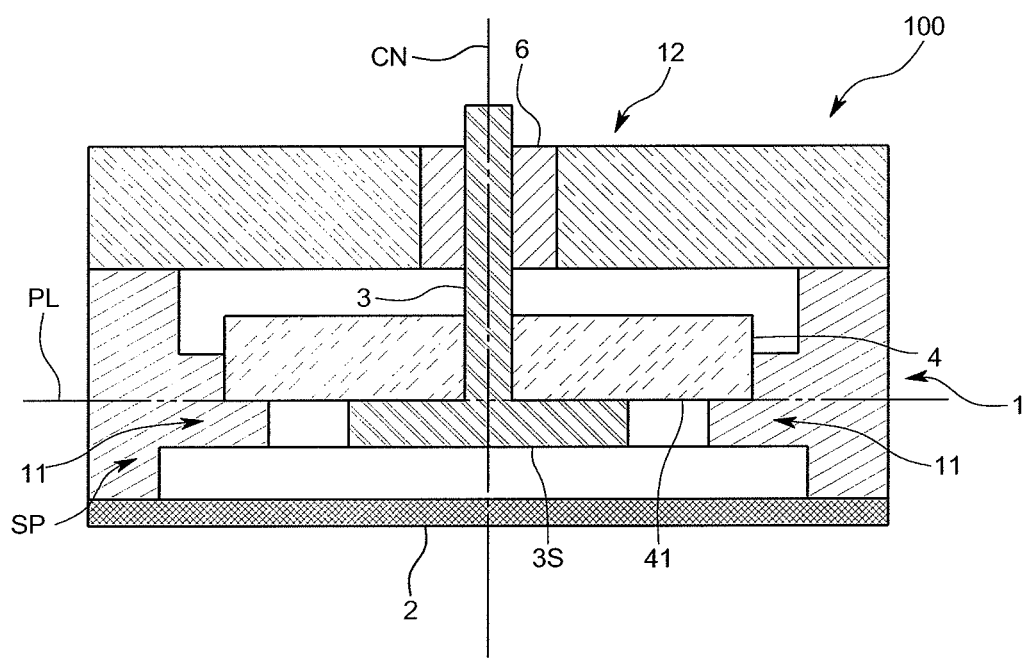
FIG. 5 schematically illustrates a cross section of a capacitive pressure sensor according to an embodiment of the present invention.

Although the electrode member 3 is separated into the measurement electrode 31 and the signal extraction electrode 32 in the above embodiment, the measurement electrode 31 and the signal extraction electrode 32 may be integrated as FIG. 5 illustrates. Even a capacitive pressure sensor as FIG. 5 illustrates has the support structure SP similar to that in the above embodiment. Thus, even if there has been an increase in temperature, the gap between the diaphragm 2 and the electrode face 3S can be kept almost constant. Thus, the measurement value of pressure is robust to a change in temperature.

Figure 6:
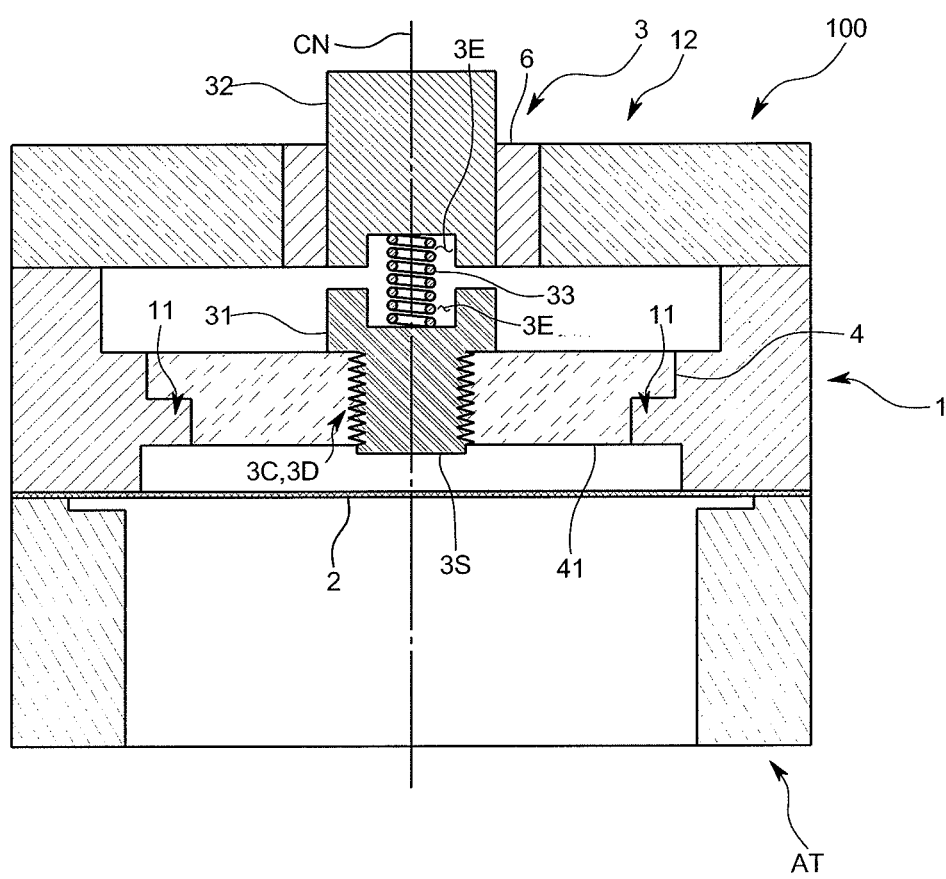
FIG. 6 schematically illustrates a cross section of a capacitive pressure sensor according to an embodiment of the present invention.
Figure 7:
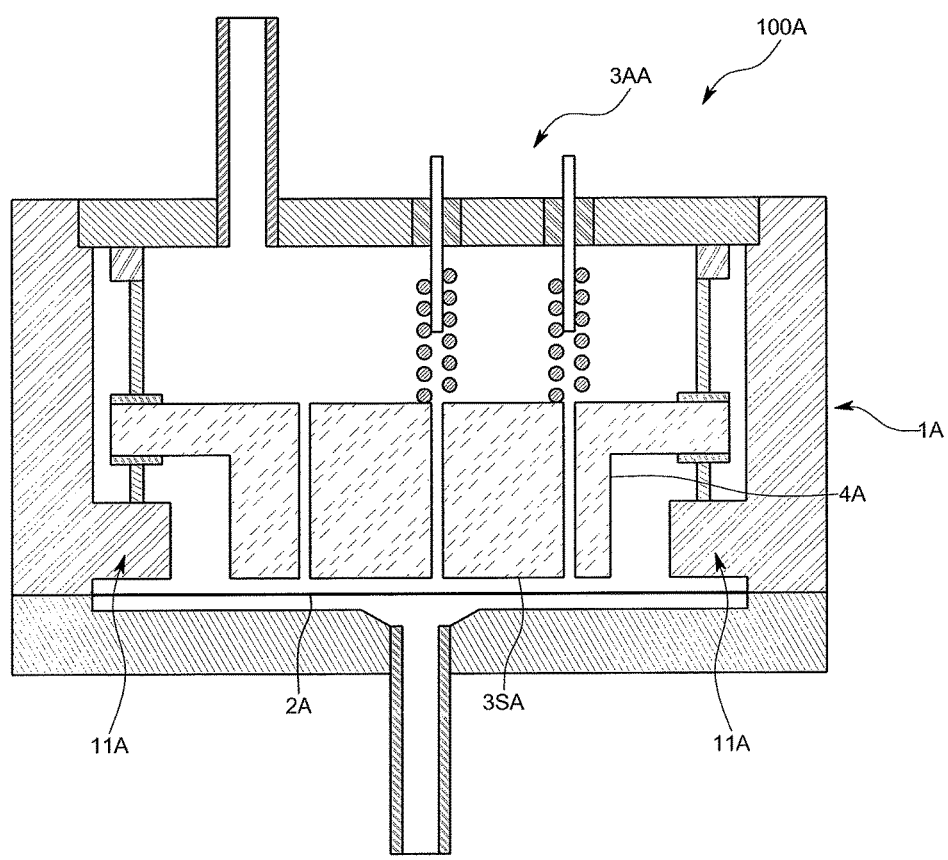
FIG. 7 schematically illustrates a cross section of a conventional capacitive pressure sensor.

Furthermore, as FIG. 6 illustrates, the accommodating depressed portion 3E may extend over the signal extraction electrode 32 and the measurement electrode 31, and the spring 33 may be provided in the accommodating depressed portion 3E as the flexible connection member. Here, the flexible connection member may be completely accommodated in the accommodating depressed portion 3, or at least a portion of the flexible connection member may be accommodated and the other portion may be exposed to the outside. In addition, the flexible connection member need not necessarily be the spring 33, but may be, for example, a conductive string or lead. That is, a flexible connection member is appropriate as long as it can maintain electrical connection and has substantially little effect on the measurement electrode 31 and the signal extraction electrode 32. Moreover, the fixing screw mechanism may also function as the nut 3D that is screwed onto the threaded portion 3C formed in the penetration 3B penetrating the insulating positioning member 4.

As is clear from the embodiments, the accommodating depressed portion may be formed in the measurement electrode or the signal extraction electrode. More precisely, the accommodating depressed portion may be formed in the measurement electrode and the signal extraction electrode, or may be formed in either the measurement electrode or the signal extraction electrode. Moreover, in the state where the flexible connection member is accommodated in the accommodating depressed portion, the entire flexible connection member may be accommodated in the accommodating depressed portion, or a portion of the flexible connection member may be exposed to the outside.

The pressing mechanisms need not necessarily be the ones described in the embodiments. For instance, the contact surface may be a curved surface rather than an inclined face so that the contact surface has line contact or point contact with the cross-section of the insulating positioning member. Moreover, the position adjuster may have only the first ring-shaped component. That is, the pressing mechanism is appropriate as long as it holds the insulating positioning member in the radial direction and forces are applied in opposite directions from opposite points. Furthermore, although the ring-shaped component has a shape of a C-shaped ring in the above embodiments, it may have a shape of a complete ring. The edges of the insulating positing part need not necessarily be inclined at 45 degrees but may be inclined at other angles, and the distribution of forces in the axial direction and in the radial direction may be appropriately adjusted.

The embodiments may be variously modified or combined without departing from the scope of the present invention.

INDUSTRIAL APPLICABILITY

The present invention improves the signal-to-noise ratio of a signal extracted from a signal extraction electrode, and provides a capacitive pressure sensor that accurately measures pressure.

What is claimed is:

1. A capacitive pressure sensor comprising:
   a diaphragm that deforms under pressure;
   an electrode member having an electrode face opposed to the diaphragm with a gap between the diaphragm and the electrode face;
   a body having one end to which the diaphragm is joined, and accommodating at least a portion of the electrode member;
   a support part that projects toward an inside of the body;
   an insulating positioning member comprising an insulating material, the insulating positioning member being supported by the support part, wherein
   the electrode member includes:
      a measurement electrode provided in the body and having the electrode face, the measurement electrode is supported by the support part;
      a signal extraction electrode fixed to the other end of the body, the signal extraction electrode extracts a signal from the measurement electrode; and
      a flexible connection member that electrically connects the measurement electrode and the signal extraction electrode, and
   the flexible connection member is accommodated in an accommodating depressed portion that is provided in the measurement electrode or the signal extraction electrode.

2. The capacitive pressure sensor according to claim 1, wherein the accommodating depressed portion is provided in one of the measurement electrode and the signal extraction electrode, and a portion of the other of the measurement electrode and the signal extraction electrode is an insertion inserted into the accommodating depressed portion, and
   the flexible connection member is provided between the insertion and the accommodating depressed portion.

3. The capacitive pressure sensor according to claim 1, wherein the flexible connection member is an elastic body, and elasticity of the flexible connection member allows the flexible connection member to come in contact with the measurement electrode and the signal extraction electrode.

* * * * *